Patented June 4, 1935

2,003,596

UNITED STATES PATENT OFFICE 2,003,596

PRODUCING AZANTHRACENE DERIVATIVES

Karl Koeberle and Ernst Ploetz, Ludwigshafen-on-the-Rhine, Germany, assignors to General Aniline Works, Inc., New York, N. Y., a corporation of Delaware No Drawing. Application July 24, 1934, Serial No. 736,777. In Germany August 5, 1933

11 Claims. (Cl. 260—40)

The present invention relates to azanthracene derivatives and a process of producing same.

We have found that halogenated azanthracenes are obtained in a simple manner by heating to a temperature above about 100° C. 1-chloro-2-naphthyl-amines which have a free 3-position and which may contain further halogen atoms with glycerine or other compounds suitable for the formation of quinoline from aniline, in the presence of mild oxidizing agents and of sulphuric acid. The formation of the quinoline ring with the 1-chloro-2-naphthylamine serving as the initial material may be effected by means of glycerine and chlorinated derivatives thereof, such as dichlorhydrin or epichlorhydrin, in the presence of sulphuric acid and of mild oxidizing agents, such as nitrobenzene, nitrobenzene sulphonic acids or their alkali metal salts, arsenic acid, nitrophenol or picric acid.

The halogenated azanthracene derivatives obtainable in good yields and in a state of good purity according to this invention may be further substituted according to the usual methods, for example halogenated by treatment with halogen or agents supplying halogen, or nitrated by treatment with nitrating agents.

The products thus obtainable may be purified by the usual methods, as for example by crystallization and in some cases by distillation, sublimation or by way of the their salts with strong acids. They are valuable for example as dyestuff-intermediates.

The following examples will further illustrate how the said invention may be carried out in practice but the invention is not restricted to these examples. The parts are by weight.

Example 1

100 parts of 1-chloro-2-aminonaphthalene, 250 parts of glycerine and 150 parts of meta-nitrobenzene sulphonic acid sodium salt are boiled in 3000 parts of 66 per cent sulphuric acid. After 4 to 5 hours the whole is diluted with water and undissolved material filtered off. By adding caustic soda solution to the filtrate, crude ms-chloroazanthracene is precipitated. It is preferably isolated by extraction with ethyl alcohol. By adding water to the concentrated alcoholic solution which has a deep blue fluorescence ms-chloroazanthracene is obtained in the form of pale yellow leaflets.

According to analysis the formula is $C_{13}H_8NCl$, the percentages being:

| | | |
|---|---|---|
| Calculated | N 6.56 | Cl 16.61 |
| Found | N 6.30 | Cl 17.00 |

The ms-chloroazanthracene obtained according to paragraph 1 of this example may be nitrated in the following manner: 10 parts of ms-chloroazanthracene are dissolved in 180 parts of concentrated sulphuric acid and 15 parts of concentrated nitric acid are added while cooling. After allowing to stand for a short time, the whole is poured onto ice, filtered and worked up in the usual manner. The nitration product is obtained in the form of red crystals.

Example 2

150 parts of 1-chloro-2-aminonaphthalene are dissolved in 1100 parts of hot 70 per cent sulphuric acid. After adding 400 parts of glycerine, a solution of 230 parts of arsenic acid in 450 parts of 70 per cent sulphuric acid are allowed to drop into the boiling solution in the course of half an hour. After continuing boiling for half an hour the conversion is complete. The reaction mixture is further worked up in the manner described in Example 1. ms-chlorazanthracene is thus obtained in a good yield.

Example 3

220 parts of 1-chloro-6-brom-2-aminonaphthalene are reacted with 1100 parts of 70 per cent sulphuric acid, 400 parts of glycerine and 230 parts of arsenic acid as described in Example 2. When the reaction is complete the mixture is diluted with water and filtered off by suction. The filtrate is rendered alkaline and the thus formed 9-chloro-6-bromazanthracene isolated in the usual manner.

Example 4

45 parts of the sulphate of 1-chloro-2-aminonaphthalene are suspended in a mixture of 200 parts of concentrated sulphuric acid with 100 parts of water and 37 parts of epichlorhydrin are added while cooling. In the course of two hours a solution of 30 parts of arsenic acid in 30 parts of 66 per cent sulphuric acid is dropped into the said mixture heated to 140° C. The reaction mixture is kept at about 140° C. for 8 hours. It is then poured onto ice and worked up in the manner described in Example 1. The reaction product thus obtained is identical to that obtained according to Example 1.

Example 5

Into a solution of 21 parts of 9-chloroazanthracene in 200 parts of chloroform, a stream of chlorine gas is led in while cooling, until the solution is saturated with chlorine. The chlorination product separating in crystalling form is filtered off by suction, washed and dried.

The product is then dissolved in diluted hydrochloric acid. After the addition of an excess of ammonia, the compound thus formed is filtered off by suction, washed and dried. It is a yellow powder having a melting point of 210° C. and is probably a 9.10-dichloroazanthracene.

By heating the product obtained according to the first paragraph of this example for 12 hours under pressure to 190° C. and working up the reaction product as described in the preceding paragraph, a product is obtained, which is a 9-chloroazanthracene probably containing 2 further chlorine atoms.

What we claim is:—

1. A process of producing 9-chloroazanthracenes which comprises heating to a temperature above about 100° C. 1-chloro-2-aminonaphthalenes which have a free 3-position and which may contain further halogen atoms with a compound selected from the group consisting of glycerine and its chlorinated derivatives in the presence of sulphuric acid and mild oxidizing agents.

2. A process of producing 9-chloroazanthracenes which comprises heating to a temperature above about 100° C. 1-chloro-2-aminonaphthalenes which have a free 3-position and which may contain further halogen atoms with glycerine in the presence of sulphuric acid and mild oxidizing agents.

3. A process of producing 9-chloroazanthracenes which comprises heating to a temperature above about 100° C. 1-chloro-2-aminonaphthalenes which have a free 3-position and which may contain further halogen atoms with epichlorhydrin in the presence of sulphuric acid and mild oxidizing agents.

4. A process of producing 9-chloroazanthracenes which comprises heating to a temperature above about 100° C. 1-chloro-2-aminonaphthalenes which have a free 3-position and which may contain further halogen atoms with a compound selected from the group consisting of glycerine and its chlorinated derivatives in the presence of sulphuric acid and of nitro compounds of the benzene series.

5. A process of producing 9-chloroazanthracenes which comprises heating to a temperature above about 100° C. 1-chloro-2-aminonaphthalenes which have a free 3-position and which may contain further halogen atoms with a compound selected from the group consisting of glycerine and its chlorinated derivatives in the presence of sulphuric acid and metanitrobenzene sulphonic acid.

6. A process of producing 9-chloroazanthracenes which comprises heating to a temperature above about 100° C. 1-chloro-2-aminonaphthalenes which have a free 3-position and which may contain further halogen atoms with a compound selected from the group consisting of glycerine and its chlorinated derivatives in the presence of sulphuric acid and arsenic acid.

7. 9-chloroazanthracenes.
8. Halogenated 9-chloroazanthracenes.
9. Nitrated 9-chloroazanthracenes.
10. 9-chloroazanthracene.
11. 9-chloro-6-bromazanthracene.

KARL KOEBERLE.
ERNST PLOETZ.